Nov. 25, 1930.  J. DYM  1,782,958
COFFEE PERCOLATOR
Filed Nov. 8, 1928   2 Sheets-Sheet 2
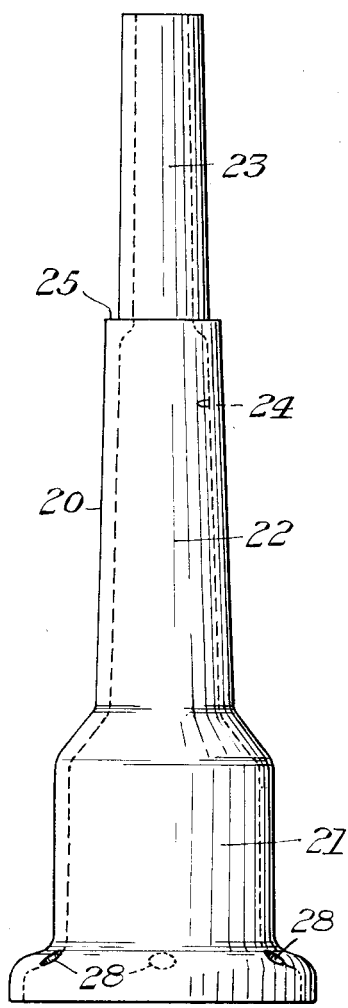
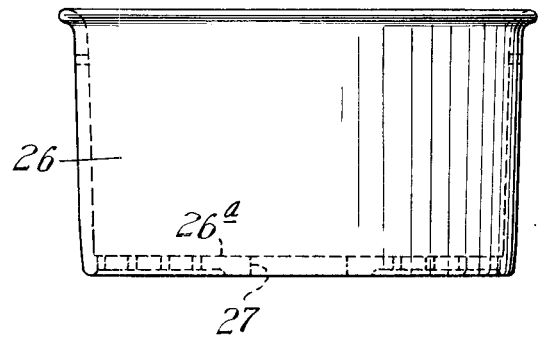
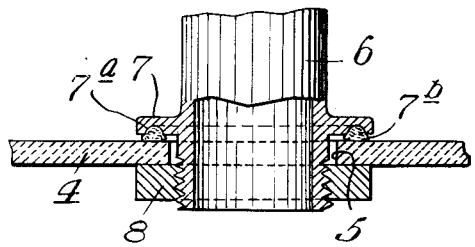
INVENTOR
Jacob Dym
by his attorneys Patented Nov. 25, 1930

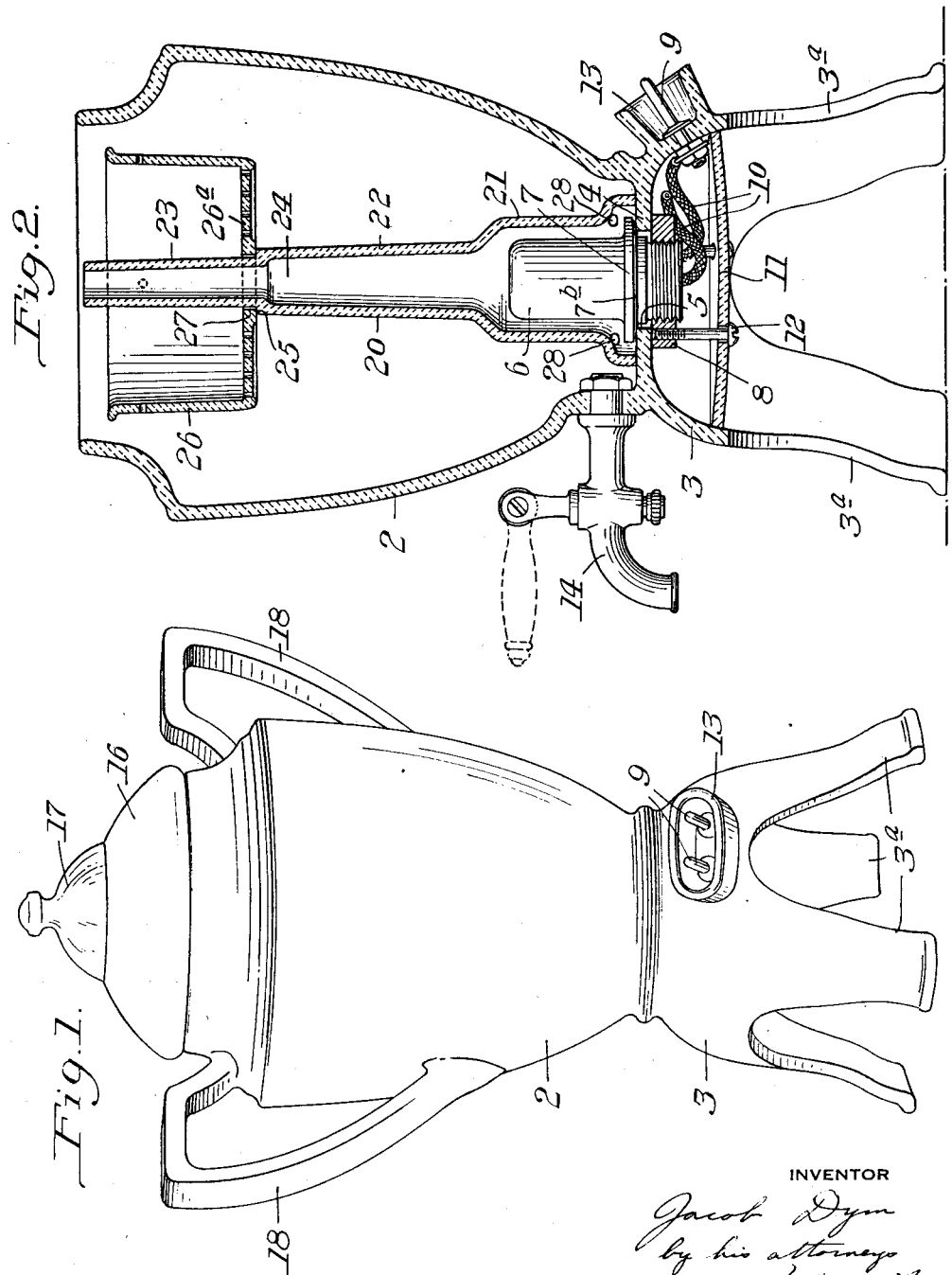

1,782,958

UNITED STATES PATENT OFFICE

JACOB DYM, OF EAST LIVERPOOL, OHIO, ASSIGNOR TO PORCELIER MANUFACTURING COMPANY, OF EAST LIVERPOOL, OHIO, A CORPORATION OF PENNSYLVANIA

COFFEE PERCOLATOR

Application filed November 8, 1928. Serial No. 317,944.

This invention relates to cooking utensils, and is for an electric coffee percolator or like utensil.

Coffee percolators as generally constructed are comprised of a metal body having an electric heating unit in the bottom thereof. Inside the body is a metal tube having a hollow base, and at the top of the tube, which is known in the art as a pump, there is a basket or receptacle having a perforate bottom adapted to hold the coffee.

In the operation of a percolator, a mass or body of water is confined in the base of the pump. It is heated by contact with the bottom of the percolator, or the heating unit at the bottom of the percolator, to the boiling point. Being confined against expansion in the bottom of the pump, it is forced up the pump tube and out the top of the tube, percolating through the basket in its return to the receptacle. Just as soon as the water in the pump is ejected through the tube in this way, it is replaced by colder water from the surrounding body in the percolator, this colder water entering through passageways in the bottom of the pump.

The pump being formed of metal, is a relatively good conductor of heat. Therefore the water which is confined in the base of the pump to be heated loses a great deal of its heat through the walls of the pump to the surrounding mass of liquid, and the pumping action does not start until the temperature of the entire mass of water has been raised to almost the temperature of the liquid inside the pump.

According to the present invention, there is provided a percolator having a pump formed of a non-metallic substance which is a poor conductor of heat. By reason of this, the heat of the confined mass in the bottom of the pump is not so rapidly dissipated to the surrounding liquid in the bottom of the percolator and the pumping action begins much more rapidly with the result that in the same length of time for the operation of the electric heater a greater volume of water will have been pumped and percolated through the contents of the basket.

It has also been proposed to form percolators having body portions formed of porcelain or earthenware and having metallic base portions in which an electric heating unit is provided. The metal base portions are united to the porcelain receptacle by rolling the metal over a bead or flange on the porcelain body. With such constructions the heat from the electric heating unit in the base of the percolator travels down the base or legs of the percolator, as it does in the ordinary all metal percolator. This requires the use of insulating buttons or pads on the base or feet of the percolator, and results in the loss of considerable heat by radiation. Due to differences in coefficients of thermal expansion, it is difficult to keep the metal base tight on the porcelain body. Furthermore, the metal which is used is comparatively thin and is apt to yield under mechanical strain, so that it is difficult to keep the body and base tightly connected.

Another difficulty is that in electric percolators as heretofore constructed, fibrous insulation has been necessary around the contact pins of the heating unit, and with repeated use, this fiber yields so that the contact pins become loose, with the result that connections are broken, short circuits occur, or the body of the percolator being brought into contact with one of the contact pins cannot be touched without danger of electric shock. Frequently water will be spilled on the fiber insulation, or get on this insulation when the percolator is being washed, rendering the percolator unfit for use until the insulation has dried out or has been replaced.

According to the present invention, there is provided a percolator which is formed entirely of a non-metallic electric and heat insulating material, the entire percolator, body and base, being integral.

My invention may be readily understood by reference to the accompanying drawings, in which Figure 1 represents a perspective view of a percolator made in accordance with my invention;

Figure 2 represents a longitudinal vertical section through the percolator;

Figure 3 is a side elevation of the pump apart from the percolator;

Figure 4 is a side elevation of the basket; and

Figure 5 is a detail view showing one manner of sealing a heating unit in the bottom of the percolator.

In the drawings, 2 designates the body or container portion of a percolator, and 3 designates the base. The body 2 and the base 3 are integral, preferably comprising an earthen or porcelain casting. At the bottom of the body portion 2 is a porcelain or earthen integral bottom 4 having a central opening 5 therein. Below the bottom 4 the base portion 3 is hollow, and is imperforate and has legs 3ª depending therefrom.

Within the hollow base 3 is a heating element 6 which projects through the opening 5 in the bottom 4. The heating element 6 has a top flange 7 which rests on the top of the bottom 4. The lower part of the heater unit 6 is threaded. On the threaded lower part of the heater unit is a nut 8, and this nut serves, in cooperation with the flange 7, to tightly clamp the heater in the bottom of the porcelain body.

In order to effectually seal the heater unit into the bottom of the receptacle and provide the necessary yielding medium between the metal and the porcelain, an annular recess 7ª is preferably formed in the under face of the flange 7 and into this recess is set a piece of pure asbestos wick 7ᵇ. When the nut 8 is screwed up on the threaded shank of the heater unit to tighten the unit into the bottom of the percolator, the asbestos wick 7ᵇ presses and seals the heater unit into the percolator.

Passing through the base 3 are a pair of contact pins 9 of the usual construction. By reason of the fact that the body and base 3 are formed of insulating material, the pins 9 pass directly through the base instead of passing through insulating bushings as has heretofore been the practice. These contact pins connect through wires 10 with the heating unit. The heating unit may be of any well known or preferred design.

Fitted into the base 3 is a plate 11 which is preferably bowed downwardly to a slight extent to give the necessary clearance. The plate 11 is removably retained in place by means of screws 12 which engage the nut 8. The plate 11 serves to seal the electric heating unit to the wiring. Being of insulating material, it will not cause a short circuit, and it will not become electrified by contact with any part of the electric circuit.

The entire assembly is therefore effectively protected against damage to any of the parts or injury to the user by reason of a short circuit. Since the body is a heat insulator, as well as an electrical insulator, the heat is confined to a small area, and it is not conducted down into the legs 3ª and dissipated. It has been found that even after operating many hours continuously, the legs 3ª will be substantially cold.

The contact pins 9 are preferably shielded by a skirt 13 of porcelain or other insulating material formed directly on the base portion 3 of the article. The skirt 13 is different from the skirt usually provided around contact pins in that the skirt usually provided is formed of metal and not of insulating material.

By reason of the fact that the body and the base are integral, there are no joints or seams which can open or spread under varying thermal conditions, or by reason of mechanical strain, and in this respect the percolator is different from percolators as heretofore constructed.

The percolator may be provided with the usual spout formed as an integral part thereof, but I prefer to use a small spigot 14 at the bottom of the body portion, this spigot being held in place by clamping nut 15.

The top 16 of the percolator is preferably formed of the same kind of material as the body and the base, but has a removable glass top 17 which may be of the type which is standard in percolators, inasmuch as these tops frequently become broken. The purpose of using a glass top is, of course, to make the percolation visible.

Secured to the sides of the body portion are handles 18 which are formed entirely of heat insulating material, and which are preferably integrally united with the body in a manner well understood in the pottery industry.

Set within the percolator is a pump 20. The pump is shown in Figure 3, and comprises a bell shaped bottom portion 21 having a reduced intermediate portion 22 and a top end portion 23. The bottom portion 21 is hollow, and there is a longitudinal hole 24 in the stem 22—23. There is a shoulder 25 between the portions 22—23 adapted to support the removable basket 26. The basket 26 is similar in shape to the metal baskets now generally used, having the form of a substantially straight sided cup with a flat perforated bottom. In the perforated bottom 26ª is a central opening 27 through which the portion 23 of the pump passes.

The pump is provided with openings or notches 28 in or near the bottom thereof through which liquid may flow to the inside of the pump. The pump is formed of porcelain or china or other frangible non-metallic substance, such as glass. The basket is also preferably formed of porcelain or like material having a low coefficient of thermal conductivity as compared with metal. The porcelain should have a heat resisting glaze which will not check or craze at the operating temperatures of the percolator so that the porcelain will not be discolored by penetration of liquid into the body of the porcelain.

The bell shaped bottom portion 21 is adapted to set over the upper end of the heating unit 6, there being a small space left inside the portion 21 around the heater 6 for liquid, as shown in Figure 2.

By reason of the fact that the porcelain is a relatively poor conductor as compared with the metal heretofore used in percolator pumps, the heat from the unit 6 will be confined to the inside of the pump, and the temperature of the water will be quickly raised to the point where it will be ejected from the top of the tube. Percolation will therefore begin much sooner than it will in the ordinary percolator, and in a given period of time a great deal more water will be pumped through the percolator than in a percolator having the ordinary metal pump. Furthermore, the flavor of the coffee is improved. It is generally recognized that the best coffee is made in non-metallic containers. With the present invention the only metal with which the fluid comes in contact is the small exposed area of the heater 6.

The operation of the percolator will also begin more quickly by reason of the fact that heat will be conducted away from the heating unit through the body of the percolator at a very slow rate. In the ordinary metal percolator both the base and the body quickly become very hot due to the rapid conduction of heat through the metal away from the heating unit. With the present invention, the heat is confined much more to the heating unit itself. There is practically no loss of heat through the dissipation of heat in the base and leg portions. Also by reason of the lower heat conductivity of the porcelain the coffee will remain hot for a longer period of time after the heat has been turned off than it will in the all metal, or part metal and part porcelain, percolator.

While it is preferred that the various parts herein referred to as being made of porcelain, be made of a high grade porcelain having a heat resisting glaze, the invention also contemplates other vitreous and semi-vitreous or frangible materials in the nature of china, glass or earthen ware. Also, the invention has been specifically described in connection with a coffee percolator, but the invention is not specifically confined to such particular application, as it may be otherwise embodied.

I claim:

1. An electric percolator comprising a one piece porcelain body having an integral base, said base being hollow, a heating unit set in the bottom of the body, a clamping nut in the base forming a part of the heating unit, a removable cover plate in the base, and screws passing through the cover plate and entering said nut for retaining the cover plate in place.

2. An electric percolator comprising a receptacle portion and a base portion adapted to hold liquid which are integral, the percolator being formed of porcelain, a pair of contact pins passing through the base portion and secured directly in the base portion, an electric heating unit contained within the base portion and projecting into the receptacle portion, and connectors leading from the contact pins to the electric heating unit.

3. An electric cooking utensil comprising an integral base and body of heat insulating material, said body having a bottom therein with an aperture therethrough, and an electric heating unit in the bottom of the body having a flange above the bottom of the body and having a threaded extension projecting through the aperture, a nut on said threaded extension below the bottom of the body for clamping the unit in place, said flange having an annular recess on the under face thereof, an asbestos packing material in the recess, and forming a sealing means between the flange on the heating unit and the bottom of the body portion.

4. An electric cooking utensil comprising an integral base and body of heat insulating material, said body having a bottom therein with an aperture therethrough, and an electric heating unit in the bottom of the body having a flange above the bottom of the body and having a threaded extension projecting through the aperture, a nut on said threaded extension below the bottom of the body for clamping the unit in place, and a compressible heat resisting sealing medium between the under face of the flange on the heating unit and the top surface of the bottom of the body.

In testimony whereof I have hereunto set my hand.

JACOB DYM.